United States Patent
Kitagawa

(10) Patent No.: US 11,245,815 B2
(45) Date of Patent: Feb. 8, 2022

(54) MONITORING APPARATUS, MONITORING SYSTEM, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Eiichiro Kitagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/353,073

(22) Filed: Mar. 14, 2019

(65) Prior Publication Data
US 2019/0297230 A1    Sep. 26, 2019

(30) Foreign Application Priority Data
Mar. 22, 2018  (JP) .............................. JP2018-055101

(51) Int. Cl.
*H04N 5/14* (2006.01)
*H04N 5/232* (2006.01)

(52) U.S. Cl.
CPC ......... *H04N 5/144* (2013.01); *H04N 5/23216* (2013.01)

(58) Field of Classification Search
CPC .......... H04N 5/232; H04N 7/18; H04N 5/144; H04N 5/23216; G08B 13/19602; G08B 13/19667; G06K 9/00771
USPC ....................................................... 348/143
See application file for complete search history.

(56) References Cited

U.S. PATENT DOCUMENTS

| | | | |
|---|---|---|---|
| 2007/0195993 A1* | 8/2007 | Chen ........................ | G06T 7/194 382/103 |
| 2009/0060352 A1* | 3/2009 | Distante ................. | G06K 9/527 382/224 |
| 2009/0290020 A1 | 11/2009 | McLeish et al. | |
| 2010/0310122 A1* | 12/2010 | Xie ..................... | G06K 9/00771 382/103 |
| 2012/0033072 A1* | 2/2012 | Lin ......................... | G06T 7/254 348/143 |
| 2012/0033073 A1* | 2/2012 | Jo ............................. | G06T 7/12 348/143 |
| 2012/0105635 A1* | 5/2012 | Erhardt ............ | G08B 13/19647 348/148 |
| 2012/0229630 A1* | 9/2012 | Huang .................... | G06T 7/254 348/143 |
| 2014/0132758 A1* | 5/2014 | Saptharishi ............... | G06T 7/90 348/135 |
| 2014/0267751 A1 | 9/2014 | Kitagawa | |
| 2016/0125268 A1* | 5/2016 | Ebiyama .............. | G06K 9/4642 382/218 |
| 2016/0173787 A1* | 6/2016 | Yun ........................ | H04N 5/232 348/143 |

(Continued)

FOREIGN PATENT DOCUMENTS

JP    2015-165433 A    9/2015

*Primary Examiner* — Zaihan Jiang
(74) *Attorney, Agent, or Firm* — Venable LLP

(57) ABSTRACT

A monitoring apparatus obtains image data captured by an image capturing apparatus, generates a background image based on the image data, performs detection processing including detection of a moving object using the image data and the background image, and sets a continuing time until the detected moving object comes to rest and is then handled as a background based on a condition concerning detection processing.

8 Claims, 13 Drawing Sheets

(56) References Cited

U.S. PATENT DOCUMENTS

| | | | |
|---|---|---|---|
| 2017/0019589 A1* | 1/2017 | Moon | H04N 5/2356 |
| 2017/0064180 A1 | 3/2017 | Kitagawa | |
| 2017/0116750 A1* | 4/2017 | Pond | G06T 7/37 |
| 2017/0220894 A1* | 8/2017 | Kuzuya | G06K 9/00228 |
| 2017/0228876 A1* | 8/2017 | Ebiyama | G06T 7/11 |
| 2017/0339348 A1* | 11/2017 | Shimizu | H04N 5/23219 |
| 2018/0017791 A1* | 1/2018 | Beckman | G02B 27/01 |
| 2018/0046863 A1* | 2/2018 | Chen | G06K 9/00744 |
| 2018/0173966 A1* | 6/2018 | Shi | G06K 9/6202 |
| 2019/0096069 A1* | 3/2019 | Qian | G05D 1/0094 |
| 2019/0130583 A1* | 5/2019 | Chen | G06K 9/00711 |
| 2019/0147601 A1* | 5/2019 | Kakuko | G06T 7/248 |
| | | | 382/103 |
| 2019/0295263 A1* | 9/2019 | Kuroki | G06T 7/254 |
| 2019/0297230 A1* | 9/2019 | Kitagawa | G08B 13/19602 |

* cited by examiner

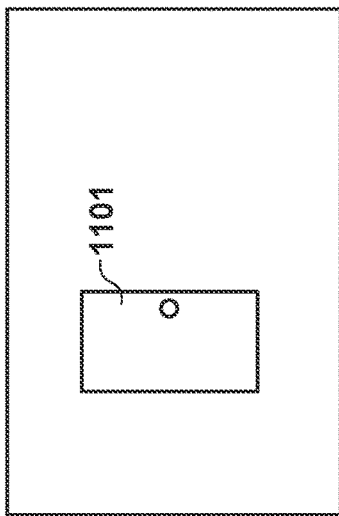
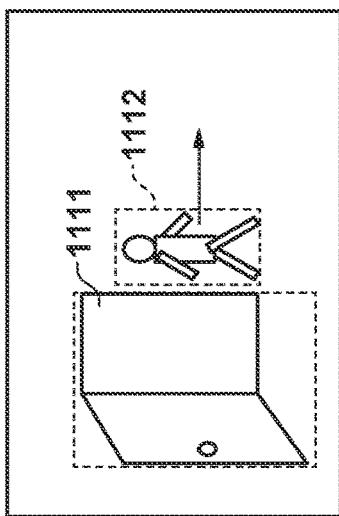
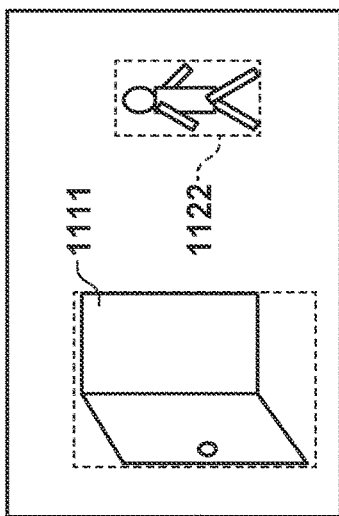
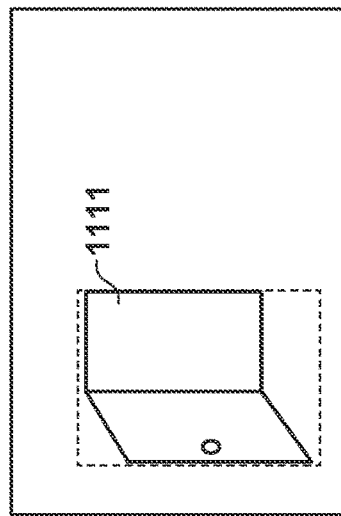
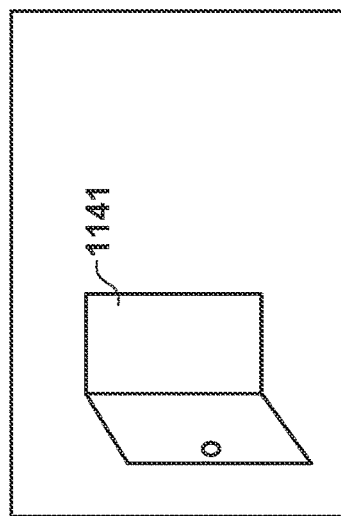

MONITORING APPARATUS, MONITORING SYSTEM, CONTROL METHOD, AND NON-TRANSITORY COMPUTER-READABLE STORAGE MEDIUM

BACKGROUND OF THE INVENTION

Field of the Invention

The present invention relates to a monitoring technique of detecting a moving object based on a captured image.

Description of the Related Art

A technique is known in a monitoring system, in which a video captured by an image capturing apparatus is input as an input image, and the input image is analyzed to determine the presence/absence of a moving object, thereby detecting the presence/absence of person intruding or object abandonment/object removal or the presence/absence of tampering on the image capturing apparatus. When continuously detecting a moving object from an input video, moving object detection using a background subtraction method can be performed.

In the moving object detection using the background subtraction method, the difference between an input video and a background image generated in advance is extracted, thereby detecting a moving object included in the input video. At this time, to improve the detection accuracy, the background image is generated by learning, for example, a sunshine variation, a fluctuation of shadow, and the like. Additionally, during the operation of such a monitoring system, for example, a still object such as a bag or a flower vase is sometimes placed in the image capturing range. Such an object is continuously detected for a predetermined period because there is a possibility that the object is abandoned by a person. However, an object that is continuously placed for a long time can be considered as a part of the background. For this reason, such an object is stored as a background image in accordance with the elapse of the predetermined period and handled as a part of the background in subsequent detection processing.

US-2009-0290020 describes a method of detecting an object using not only a difference in an image feature amount but also time information representing how long the image feature amount exists in a video as conditions to determine a foreground and a background in a captured image. In addition, Japanese Patent Laid-Open No. 2015-165433 describes a technique of performing person detection in a moving object region and handling a moving object of a high person likelihood as a foreground even after the elapse of a predetermined time, thereby inhibiting background setting of a person standing still for a long time.

An object that is detected as a moving object and then handled as a background is a monitoring target until the object is determined as a background. For this reason, for example, images may be accumulated until the object is detected and determined as a background. If this time is unnecessarily long, unnecessarily many images are accumulated. This may waste the storage capacity of the apparatus or increase the number of images that need to be observed until the user obtains necessary information. When this time is shortened, accumulation of unnecessary images is suppressed. However, even necessary images may not be accumulated. As a result, the convenience of the monitoring system may be lowered.

SUMMARY OF THE INVENTION

The present invention improves the convenience of a monitoring system.

According to one aspect of the present invention, there is provided a monitoring apparatus comprising: an obtaining unit configured to obtain image data captured by an image capturing apparatus; a generation unit configured to generate a background image based on the image data; a detection unit configured to perform detection processing including detection of a moving object using the image data and the background image; and a setting unit configured to set a continuing time until the moving object detected by the detection unit comes to rest and is then handled as a background based on a condition concerning detection by the detection unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 11A to 11E are views for explaining detection of a moving object and the procedure until background setting of the detected moving object;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

In this embodiment, the length of the time from generation of a background image (from the start of generation processing) to execution of detection processing is decided in accordance with the length of time required in detection processing, in which a moving object should continuously be detected. The longer the lapse time from the generation of the background image becomes, the longer the length of the time to detect a moving object as a moving object becomes. In addition, the length of the time in which a moving object should continuously be detected as a moving object changes depending on the type of detection processing. For this reason, for example, when executing the detection processing of the short time length, the start timing of the detection processing is controlled to wait for the time length corresponding to the detection processing, thereby preventing waiting for an unnecessary long time.

(System Arrangement)

Figure 1:
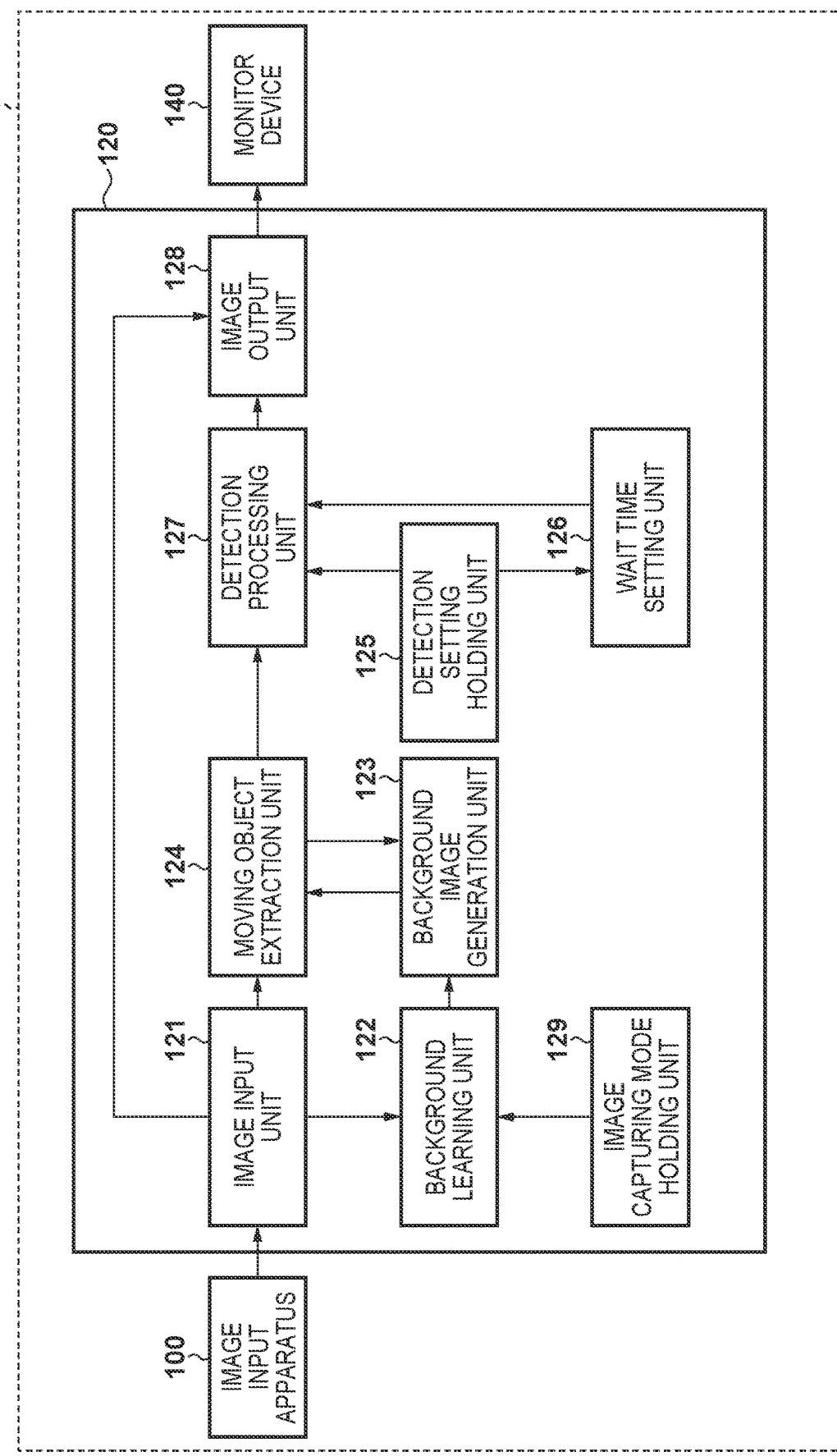
FIG. 1 is a block diagram showing the first example of an example of a system arrangement and the functional arrangement of a monitoring apparatus.

FIG. 1 shows an example of the arrangement of a monitoring system 1 including a monitoring apparatus 120 according to this embodiment. The monitoring system 1 includes an image input apparatus 100, the monitoring apparatus 120, and a monitor device 140. The monitoring system 1 is a system configured to, by the device configurations, detect a moving object in a captured image, detect the presence/absence of passage or intruding of a moving object, object abandonment/object removal, tampering, and the like, and display the detection result.

The image input apparatus 100 is an apparatus configured to generate a captured image by capturing the periphery, and is formed by a camera or the like. The image input apparatus 100 outputs image information including captured image data to the monitoring apparatus 120. Upon obtaining the image information from the image input apparatus 100, the monitoring apparatus 120 performs detection processing of detecting a moving object from the image data included in the image information and detecting the presence/absence of passage or intruding of a moving object, object abandonment/object removal, tampering on the image input apparatus 100, and the like. Note that in a case in which a moving object is detected and then comes to rest, the monitoring apparatus 120 can continue the detection until the moving object is regarded as a background. The time in which the moving object is continuously detected even after it has come to rest will be referred to as a detection continuing time hereinafter. When a moving object remaining at rest is continuously detected beyond a predetermined detection continuing time, the monitoring apparatus 120 regards the moving object as a background, and the moving object is thus handled as a background (background setting). The detection continuing time is set to 100 sec or more for intruding detection, 600 sec or more for abandonment/removal detection, and 60 sec or more for tampering detection. The monitoring apparatus 120 outputs the detection result and the processed image to the monitor device 140, and the monitor device 140 displays the image input from the monitoring apparatus 120.

Figure 2:
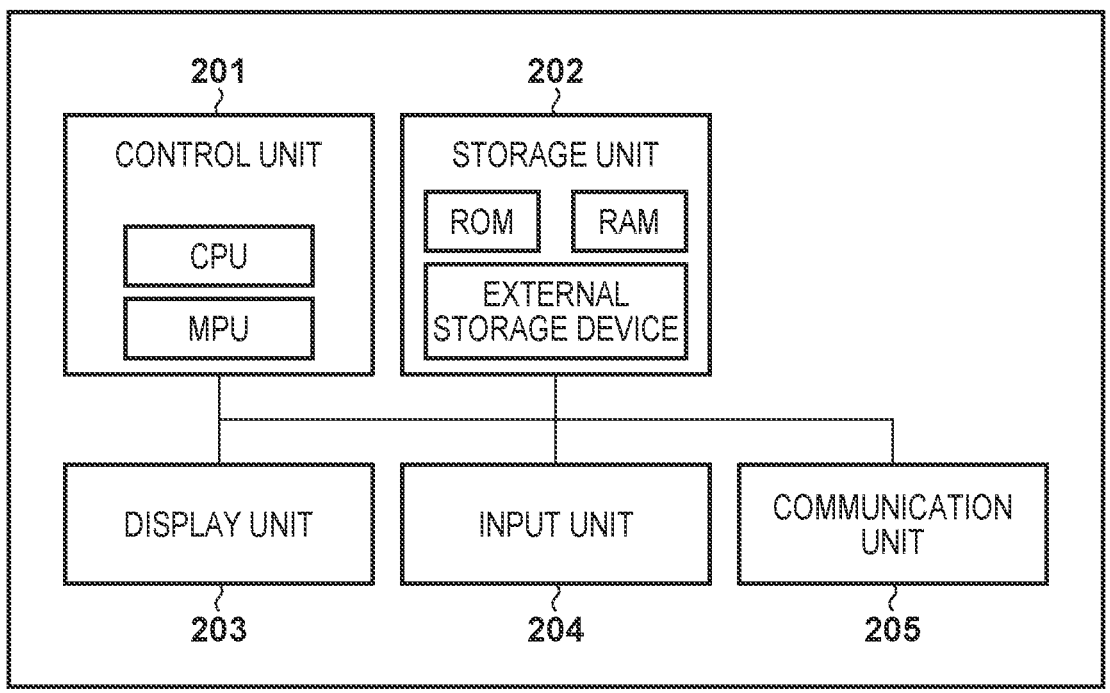
FIG. 2 is a block diagram showing an example of the hardware arrangement of the monitoring apparatus.

FIG. 1 shows an example of the functional arrangement of the monitoring apparatus 120. In one example, this functional arrangement is implemented by a hardware arrangement as shown in FIG. 2. In one example, the monitoring apparatus 120 includes a control unit 201, a storage unit 202, a display unit 203, an input unit 204, and a communication unit 205. Note that the components shown in FIG. 2 are merely examples. Some of the components shown in FIG. 2 may be omitted, or constituent elements may be added to the components shown in FIG. 2. In addition, a plurality of blocks shown in FIG. 2 may be integrated into one block, or one block shown in FIG. 2 may be divided into a plurality of blocks. Some or all of the components shown in FIG. 2 may be replaced with other constituent elements. Note that in remaining embodiments following this embodiment as well, the monitoring apparatus 120 has a hardware arrangement as shown in FIG. 2.

The control unit 201 executes programs stored in, for example, the storage unit 202, thereby performing overall control of the monitoring apparatus 120 and various kinds of processing. In one example, the control unit 201 includes at least one processor such as a CPU or an MPU. Note that the control unit 201 may perform overall control of the monitoring apparatus 120 and various kinds of processing using another arbitrary processor such as a logic circuit implemented by an ASIC (Application Specific Integrated Circuit) or an FPGA (Field Programmable Gate Array). The storage unit 202 stores, for example, the programs to be executed by the control unit 201 and provides a work area used by the control unit 201 during execution of the programs. Note that the storage unit 202 includes, for example, memories such as a ROM (Read Only Memory) and a RAM (Random Access Memory) and an external storage device such as a hard disk drive. The display unit 203 includes, for example, a screen display function such as an LCD (Liquid Crystal Display) or an organic EL display and various kinds of functions of visually presenting information by a light emitting pattern of an LED (Light Emitting Diode). In addition, the display unit 203 may also include a device that presents information by a voice/sound. In one example, the monitoring apparatus 120 can visually present various kinds of information such as a setting screen used to data obtaining and display, an image received from the image input apparatus 100, and various messages to the user of the self-apparatus via the display unit 203. The monitoring apparatus 120 may also has, for example, a display control function of displaying an image on an external display. In this case, the display unit 203 need not have the screen display function. The input unit 204 includes, for example, operation acceptance devices such as a button, a 4-way selector, a touch panel, and a mouse. The input unit 204 converts the contents of a user operation into an electrical signal and notifies the control unit 201 of it. The communication unit 205 performs communication with another apparatus such as the image input apparatus 100 or the monitor device 140. For example, the communication unit 205 includes a modulation/demodulation circuit and an interface for wired or wireless communication. The communication unit 205 may have a plurality of interfaces to, for example, communicate with the image input apparatus 100 using Ethernet® and communicate with the monitor device 140 using a video interface.

The monitoring apparatus 120 implements the functional arrangement as shown in FIG. 1 by the hardware arrangement. Note that at least some of the components are used in processing to be described in the following embodiment, but not all of them need to be used. That is, in some of the following embodiments, some of the functions shown in FIG. 1 may not be used. In addition, the example of the functional arrangement shown in FIG. 1 is a merely an example, and various components capable of executing the same processes as those to be described later can be used.

In the functional arrangement shown in FIG. 1, an image input unit 121 obtains, from the image input apparatus 100, image information concerning an image captured by the image input apparatus 100, and outputs the image information to a background learning unit 122, a moving object extraction unit 124, and an image output unit 128. An image capturing mode holding unit 129 holds the current image capturing mode and, when the image capturing mode is updated by a user operation, outputs image capturing mode change information to the background learning unit 122. The background learning unit 122 performs learning processing of the background using the image input from the image input unit 121. Also, upon receiving the image capturing mode change information from the image capturing mode holding unit 129, the background learning unit 122 discards background learning information up to the point of time and executes relearning processing of the background. When background image generation processing is started, the background learning unit 122 outputs the image information input from the image input unit 121 as a background image to a background image generation unit 123. In addition, the background learning unit 122 generates variation information of a later sunshine variation on the background or fluctuation information of a fluctuation of a water surface or trees and continuously outputs the information to the background image generation unit 123. By using such fluctuation information, a fluctuation in the captured image can be prevented from erroneously being detected as a moving object.

The background image generation unit 123 generates and updates the background image based on the image information and the variation information or fluctuation information input from the background learning unit 122. The background image generation unit 123 outputs the generated/updated background image information to the moving object extraction unit 124. The moving object extraction unit 124 performs extraction processing of a moving object included in the input image based on the image information input from the image input unit 121 and the background image information input from the background image generation unit 123, and outputs the extracted moving object information to a detection processing unit 127. Note that the extraction of the moving object is performed using, for example, the background subtraction method. The background subtraction method will briefly be described here.

In detection of a moving object using the background subtraction method, the difference between an input video and a background image generated in advance is extracted, thereby detecting a moving object included in the input video. Additionally, along with the gradual change of the background caused by a sunshine variation or the like, the background image is gradually updated based on the past change, or a plurality of background images are prepared and compared, thereby suppressing the occurrence of a detection error of a moving object. This can maintain a high detection accuracy even in a case in which, for example, monitoring is performed for a long time in an outdoor environment. In such a method, immediately after the background image is generated, even an object that is not a moving object, for example, a background object moved by a wind may be detected as a moving object. For this reason, the detection continuing time that is the time to continuously detect an object detected as a moving object as a moving object can be set in proportion to the lapse time from the generation of the background image such that an object detected immediately after the generation of the background image is handled early as a background.

In this embodiment, the moving object extraction unit 124 compares the image information input from the image input unit 121 with the background image input from the background image generation unit 123, and extracts a region with a difference as a moving object. The image of the extracted moving object region is input to the background image generation unit 123. The background image generation unit 123 saves the image obtained from the moving object extraction unit 124 as a foreground image together with an appearance count value representing the length of the time in which the moving object exists in the captured image. The background image generation unit 123 outputs the saved foreground image and the background image to the moving object extraction unit 124. Accordingly, the moving object extraction unit 124 compares both the background image and the foreground image with the input image. The moving object extraction unit 124 handles a portion matching the foreground image as a moving object region, and transmits the information of the matching region to the background image generation unit 123. Based on the information of the foreground region obtained from the moving object extraction unit 124, the background image generation unit 123 updates the appearance count value corresponding to the foreground region. In a case in which the updated appearance count value exceeds the detection continuing time, the background image generation unit 123 saves the foreground image as a background image and deletes the foreground image information concerning the foreground image. With this processing, an object continuously at rest for a predetermined time or more is handled as a background, and the object set to the background is not extracted any more.

Figure 3:
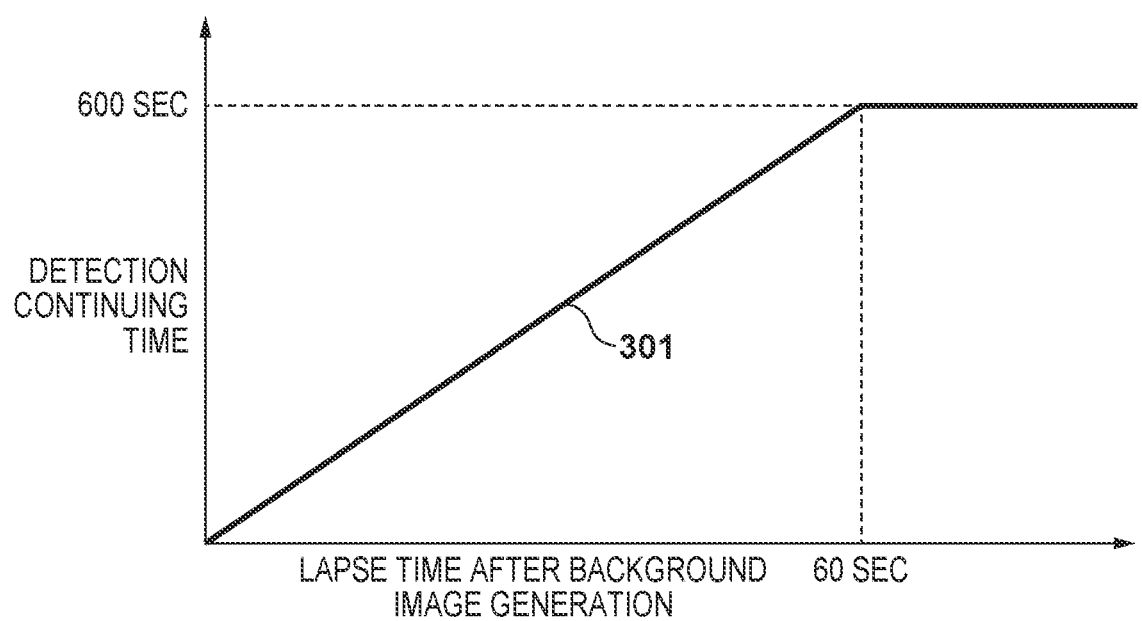
FIG. 3 is a graph showing the relationship between a lapse time after generation of a background image and the continuing time of moving object detection.

The lapse time after the start of generation of a background image and the detection continuing time of a moving object will be described here with reference to FIG. 3. FIG. 3 shows the relationship between the lapse time after background image generation and a detection continuing time corresponding to each lapse time. As described above, the detection continuing time is a time to determine a moving object as a background in a case in which the moving object remaining at rest is continuously detected beyond the detection continuing time. Immediately after a background image is generated, background learning of the background learning unit 122 may be insufficient, and moving object detection may be performed in a relatively unstable state so that a sunshine variation or fluctuation is detected as a moving object. However, when learning progresses along with the elapse of time, such instability is eliminated. Hence, as indicated by a line 301, when the lapse time after background image generation is short, the detection continuing time is set to be short such that a moving object detected in the unstable state is early set to the background. On the other hand, when the lapse time after background image generation has become sufficiently long, the detection is assumed to be stable, and the time until a moving object detected in that state is set to the background is set to be long. In one example, the length of the lapse time after the start of generation of the background image and the detection continuing time (the length of the period in which a moving object can continuously be detected as a moving object) are proportional until the detection continuing time reaches the maximum value.

A detection setting holding unit 125 saves the information of an activated/inactivated setting for at least one of the detection settings of moving object passage detection, intruding detection, abandonment/removal detection, and tampering detection, which is set by the user, and the settings of detection rules. The settings of detection rules can include, for example, a setting of a passage line for passage detection, a setting of an entry prohibited area for intruding detection, or a setting of a detection area for abandonment/removal detection. The detection setting holding unit 125 outputs the held detection setting information to a wait time setting unit 126 and the detection processing unit 127.

Figure 4A:
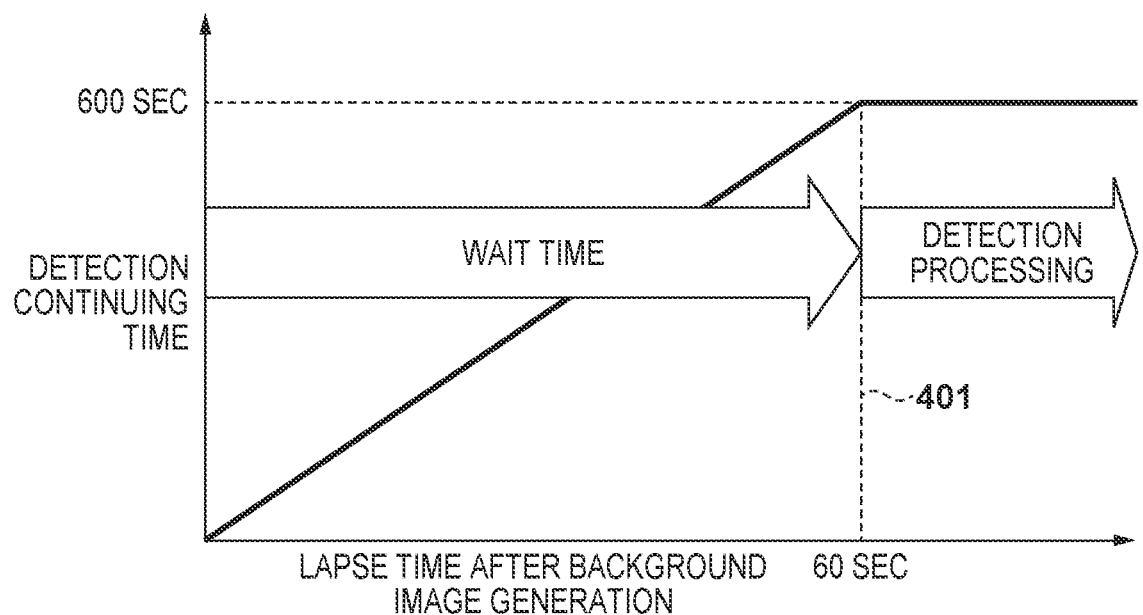
FIGS. 4A and 4B are graphs showing the first example of the relationship between a detection setting and a wait time.
Figure 4B:
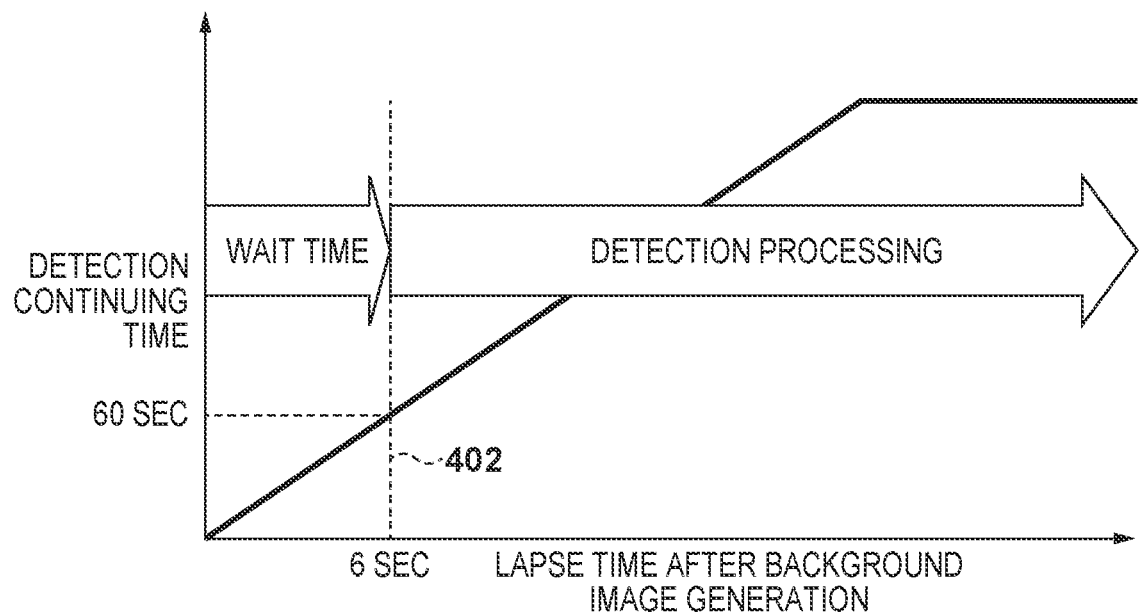

The wait time setting unit 126 obtains detection setting information from the detection setting holding unit 125 at the time of background image generation, decides a time (wait time) to wait for the start of detection processing after background image generation based on an activated detection setting, and performs count-up of the wait time. The wait time setting unit 126 outputs the wait time information after background image generation to the detection processing unit 127. The relationship between the detection continuing time and the wait time according to the detection setting information will be described here with reference to FIGS. 4A and 4B. As described above with reference to FIG. 3, the detection continuing time up to background setting of a moving object is proportional to the lapse time from generation of the background image. For this reason, it is necessary to wait for execution of detection up to the timing capable of ensuring the detection continuing time by the time in which a moving object should continuously be detected as a moving object. For example, when abandonment/removal detection is set as the detection setting, a detection continuing time of 600 sec needs to be ensured. In this case, as indicated by a broken line 401 in FIG. 4A, a wait time of, for example, 60 sec needs to be provided after generation of the background image. Hence, the wait time setting unit 126 can set the wait time to "60 sec" for abandonment/removal detection. Additionally, for example, in tampering detection, a detection continuing time of, for example, 60 sec needs to be ensured. Since this detection continuing time is 1/10 as compared to abandonment/removal detection, the wait time can also be 1/10, that is, 6 sec after generation of a background image, as indicated by a broken line 402 in FIG. 4B. Hence, the wait time setting unit 126 can set the wait time to "6 sec" for tampering detection. Furthermore, when a detection continuing time of 100 sec needs to be ensured for intruding detection, the wait time before the start of intruding detection can be to, for example, "10 sec". As described above, the wait time from generation of a background image to the start of detection processing is decided for each detection setting in accordance with the length of the time in which detection of a moving object should be continued, detection processing can appropriately be executed. Note that if a plurality of detection settings are activated, the wait time setting unit 126 can set the wait time in accordance with a detection setting with the longest detection continuing time in the activated detection settings. For example, the wait time setting unit 126 can set the wait time to 6 sec for a detection setting in which only tampering detection is activated. Additionally, for a detection setting in which abandonment/removal detection is activated in addition to the tampering detection, the wait time setting unit 126 can set the wait time to 60 sec based on the detection (abandonment/removal detection) with the longer time. This makes it possible to appropriately set the wait time before execution of detection processing in accordance with the combination of activated detection processing.

The detection processing unit 127 obtains moving object information from the moving object extraction unit 124, detection setting information from the detection setting holding unit 125, and wait time information from the wait time setting unit 126, and performs various kinds of detection processing based on these pieces of information. For example, the detection processing unit 127 determines, based on the wait time information input from the wait time setting unit 126, whether the current state is a wait state, and does not execute the various kinds of detection processing during the wait state. When the detection setting information of passage detection is obtained, the detection processing unit 127 determines whether the moving object extracted by the moving object extraction unit 124 has passed the passage line input from the detection setting holding unit 125. In addition, when the detection setting information of intruding detection is obtained, the detection processing unit 127 determines whether the moving object extracted by the moving object extraction unit 124 is included in the entry prohibited area input from the detection setting holding unit 125. Additionally, when the detection setting information of abandonment/removal detection is obtained, the detection processing unit 127 determines whether the moving object extracted by the moving object extraction unit 124 exists in the detection area input from the detection setting holding unit 125. Note that in the removal detection as well, when an object that has originally existed is absent, a region where the object should originally exist is extracted as a moving object, and therefore, detection can be performed by the same algorithm as that of abandonment detection. In addition, when the detection setting information of tampering detection is obtained, the detection processing unit 127 determines whether the moving object extracted by the moving object extraction unit 124 occupies a predetermined ratio or more, for example, 70% or more of the screen. If the moving object occupies the predetermined ratio or more of the screen, the detection processing unit 127 determines that certain tampering (changing of the camera viewing angle, application of a spray, or the like) has been done on the image input apparatus 100. The detection processing unit 127 outputs information representing the detection result to the image output unit 128.

The image output unit 128 generates an image by superimposing the information of various kinds of detection results input from the detection processing unit 127 on the image information input from the image input unit 121, and outputs the information of the generated image to the monitor device 140.

(Procedure of Processing)

Figure 5A:
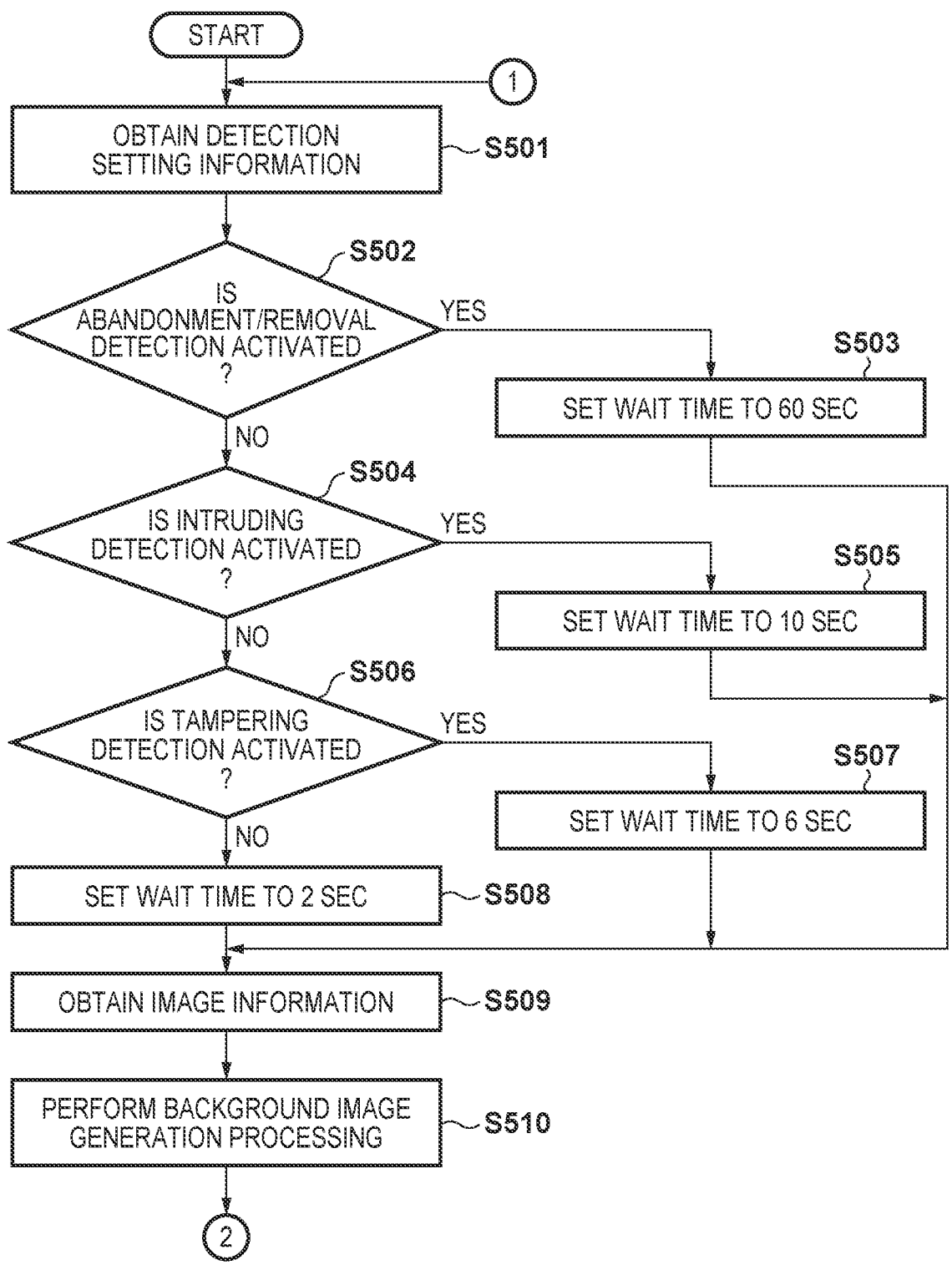
FIGS. 5A and 5B illustrate a flowchart showing the first example of processing executed by the monitoring apparatus.
Figure 5B:
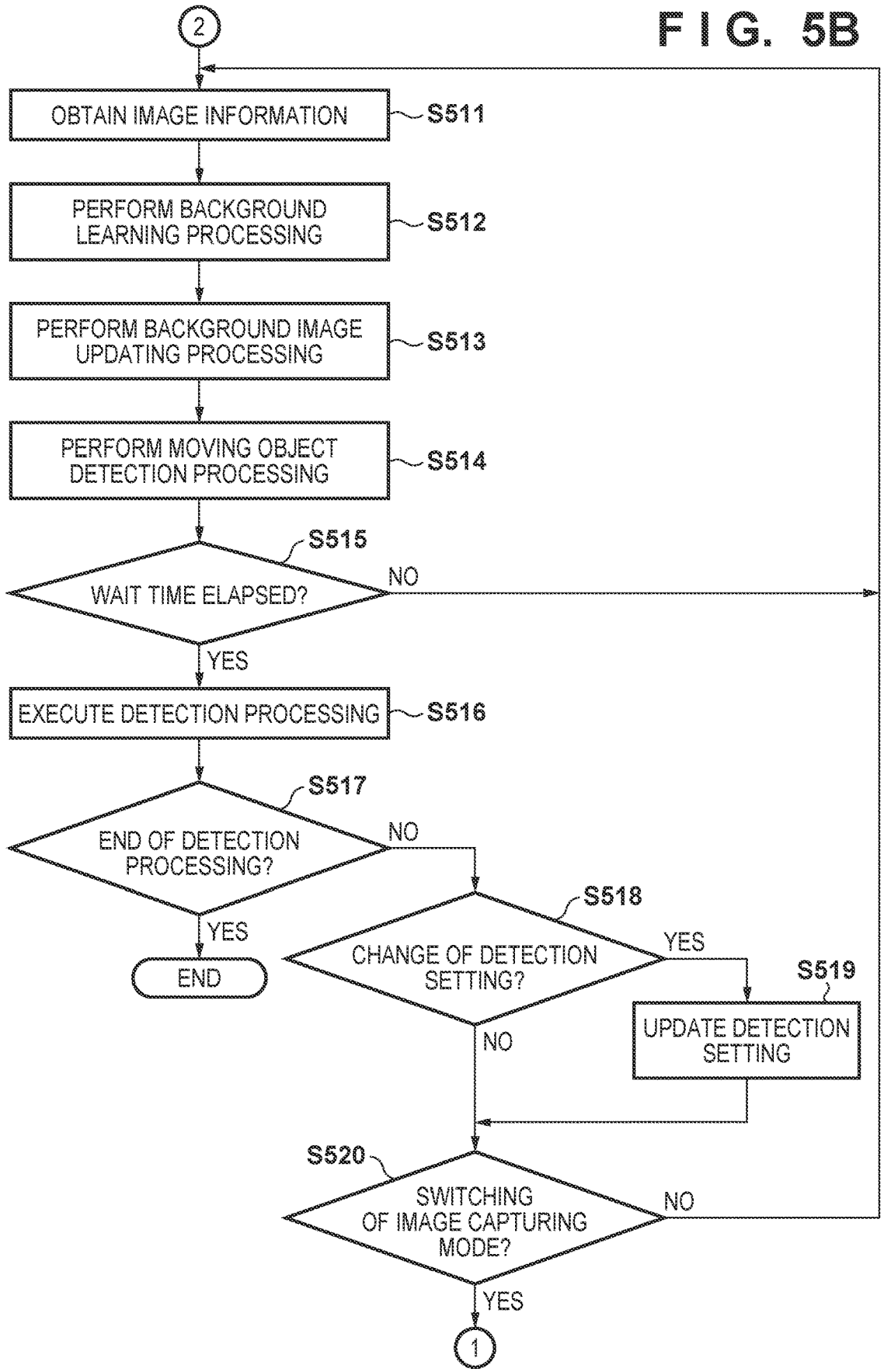

An example of the procedure of processing executed by the monitoring apparatus 120 will be described next with reference to FIGS. 5A and 5B. The monitoring apparatus 120 starts the processing shown in FIGS. 5A and 5B when the monitoring system 1 is activated by, for example, a user operation to start monitoring processing. In one example, this processing is implemented when the control unit 201 executes a program stored in the storage unit 202. However, a description will be made below based on the functional blocks shown in FIG. 1.

In the monitoring apparatus 120, first, the wait time setting unit 126 obtains detection setting information from the detection setting holding unit 125 (step S501). The wait time setting unit 126 determines whether abandonment/removal detection is activated in the obtained detection setting information (step S502). Upon determining that abandonment/removal detection is activated (YES in step S502), the wait time setting unit 126 sets the wait time from background image generation to the start of detection processing to 60 sec and starts count-up (step S503). After that, the process advances to step S509. On the other hand, if abandonment/removal detection is not activated (NO in step S502), the wait time setting unit 126 subsequently determines whether intruding detection is activated in the detection setting information (step S504). Upon determining that intruding detection is activated (YES in step S504), the wait time setting unit 126 sets the wait time from background image generation to the start of detection processing to 10 sec and starts count-up (step S505). After that, the process advances to step S509. On the other hand, if intruding detection is not activated (NO in step S504), the wait time setting unit 126 subsequently determines whether tampering detection is activated in the detection setting information (step S506). Upon determining that tampering detection is activated (YES in step S506), the wait time setting unit 126 sets the wait time from background image generation to the start of detection processing to 6 sec and starts count-up (step S507). On the other hand, if tampering detection is not activated (NO in step S506), the wait time setting unit 126 sets the wait time from background image generation to the start of detection processing to 2 sec and starts count-up (step S508). In the above-described way, the wait time can be set based on the type of the longest detection continuing time in the activated detection types. This can prevent the wait time from being unnecessarily prolonged in a case in which only detection processing of a type of a short detection continuing time is executed. After step S507 or S508, the process advances to step S509.

In step S509, the image input unit 121 obtains image information from the image input apparatus 100. The image obtained by the image input unit 121 is input to the background learning unit 122 and the moving object extraction unit 124. The background learning unit 122 can initially output the input image directly to the background image generation unit 123. The background image generation unit 123 generates a background image based on the background image information input from the background learning unit 122 (step S510). On the other hand, the image input unit 121 further obtains image information from the image input apparatus 100 (step S511), and inputs the image information to the background learning unit 122 and the moving object extraction unit 124. The background learning unit 122 performs learning processing of the background using the image information input from the image input apparatus 100 (step S512). The background learning unit 122 inputs variation information or fluctuation information obtained by learning to the background image generation unit 123. The background image generation unit 123 performs updating processing of the background image using the variation information or fluctuation information obtained from the background learning unit 122 (step S513). The background image generated by the background image generation unit 123 is input to the moving object extraction unit 124. The moving object extraction unit 124 performs moving object detection processing based on the image information input from the image input unit 121 and the background image information input from the background image generation unit 123 (step S514). When a moving object is detected, for example, a captured image during detection of the detection is saved. The detection processing unit 127 determines whether the wait time set by the above-described processing in steps S502 to S508 has elapsed from the start of background image generation (for example, the process of step S510). If the wait time has not elapsed (NO in step S515), the detection processing unit 127 returns the process to step S511 without executing detection processing. On the other hand, if the wait time has elapsed (YES in step S515), the detection processing unit 127 executes various kinds of detection processing based on the detection setting information obtained from the detection setting holding unit 125 (step S516).

After that, the monitoring apparatus 120 determines whether a stop operation of monitoring processing is performed by, for example, operating a monitoring processing on/off switch (not shown) by a user operation (step S517). If the stop operation is performed (YES in step S517), this processing is ended. On the other hand, if the stop operation is not performed (NO in step S517), the detection setting holding unit 125 determines whether the detection setting is updated by, for example, a user operation (step S518). Upon determining that the detection setting is updated (YES in step S518), the detection setting holding unit 125 updates the detection setting (step S519). Next, the image capturing mode holding unit 129 determines whether switching of the image capturing mode is performed by, for example, a user operation (step S520). On the other hand, if the detection setting holding unit 125 determines that the detection setting is not updated (NO in step S518), the determination of step S520 is performed without updating the detection setting. If the image capturing mode holding unit 129 determines that switching of the image capturing mode is performed (YES in step S520), the process returns to step S501. On the other hand, if the image capturing mode holding unit 129 determines that switching of the image capturing mode is not performed (NO in step S520), the process returns to step S511. Note that in step S520, it is determined whether switching of the image capturing mode is performed. However, it may be determined whether an image capturing setting change that requires relearning of the background is performed. That is, if a state that needs redoing of learning of the background is set, the process returns to step S501. On the other hand, if redoing of learning of the background is not necessary, the detection processing is repeated while continuing learning.

As described above, in this embodiment, the wait time from the start of background image generation to execution of detection processing can appropriately be set in accordance with the type of activated detection processing. Accordingly, for example, even when only the tampering detection is activated, and the abandonment/removal detection is inactivated, the unnecessary wait time that makes the user wait for the wait time corresponding to the abandonment/removal detection can be reduced, and the convenience can be improved.

Note that the above-described arrangements and processing procedures are merely examples, and various changes can be made. For example, in the processing shown in FIGS. 5A and 5B, the wait time is set by determining stepwise whether each of the plurality of detection processes is activated or not. However, processing of specifying the wait time of each of the plurality of detection processes and specifying the maximum value may be performed. In addition, the above-described processing steps may be performed in a reverse order or may be executed in parallel.

Second Embodiment

In the first embodiment, processing of setting a wait time adapted to a condition using the type of detection processing as the condition has been described. In this embodiment, a method of setting a wait time adapted to a condition using the magnitude of a variation or fluctuation of an image (caused by, for example, the image capturing mode or the like) as the condition will be described. Accordingly, when, for example, a learning result is assumed to early converge in a case in which the variation or fluctuation is small, the wait time is shortened, thereby preventing an unnecessary wait time from occurring.

Figure 6:
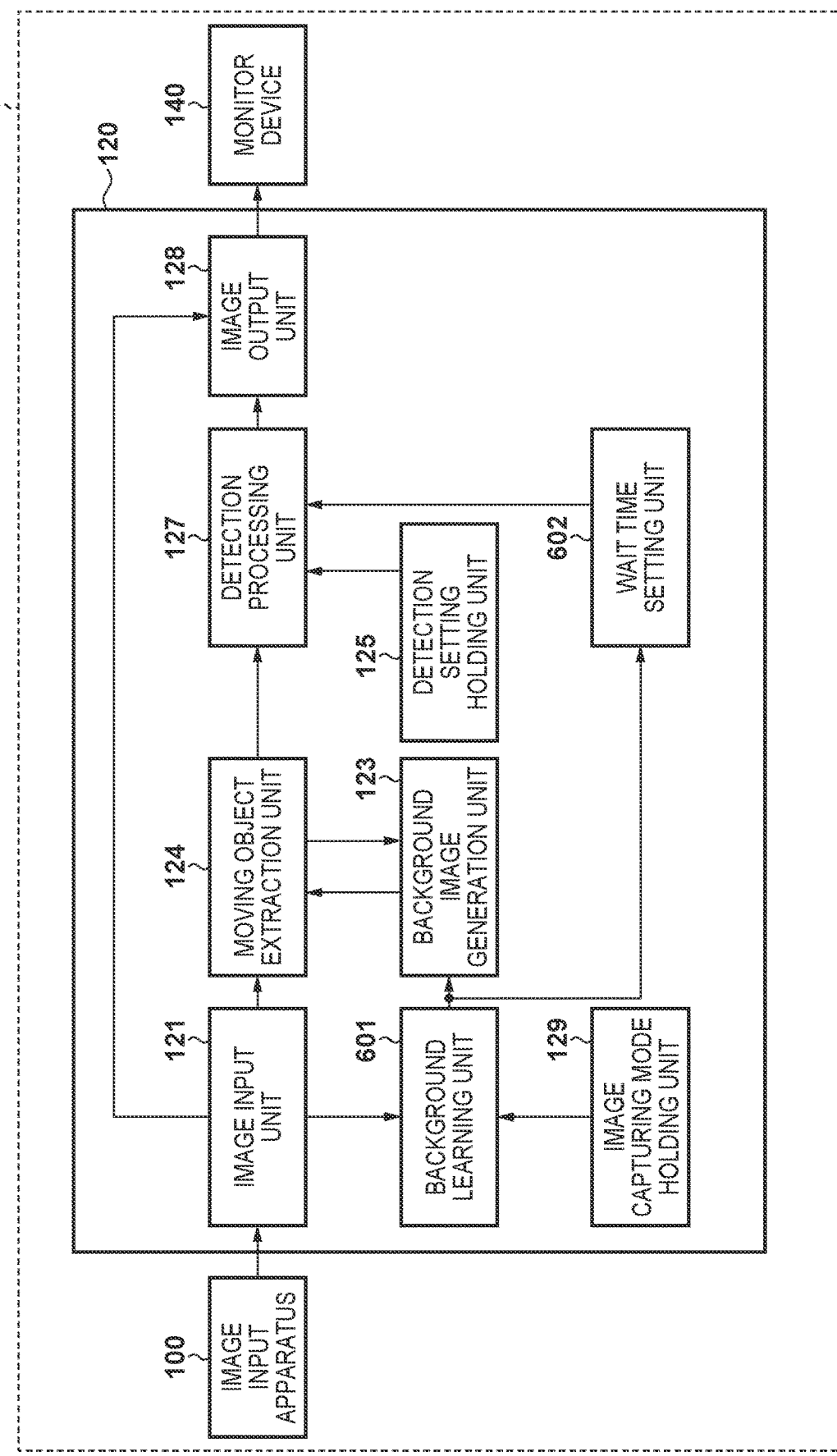
FIG. 6 is a block diagram showing the second example of an example of a system arrangement and the functional arrangement of a monitoring apparatus.

FIG. 6 shows an example of the arrangement of a monitoring system 1 including a monitoring apparatus 120 according to this embodiment. This embodiment is different from the first embodiment mainly in the processes of a background learning unit 122 and a wait time setting unit 126, and a description will be made with focus placed on this point. Note that the background learning unit and the wait time setting unit according to this embodiment will be referred to as a "background learning unit 601" and a "wait time setting unit 602", respectively, hereinafter.

Figure 7:
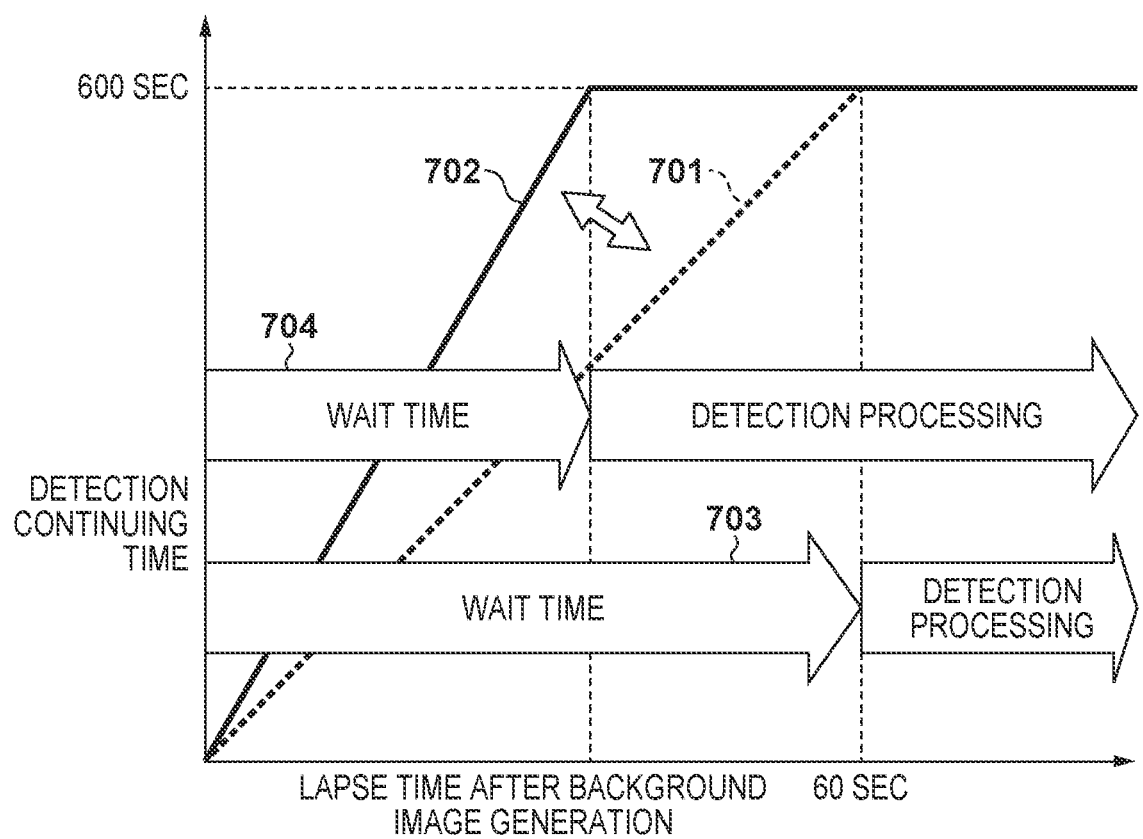
FIG. 7 is a graph showing the second example of the relationship between a detection setting and a wait time.

The background learning unit 601 performs learning processing of a background using an image input from an image input unit 121, as in the first embodiment, and outputs variation information or fluctuation information to the wait time setting unit 602 in addition to a background image generation unit 123. The wait time setting unit 602 determines a variation amount such as a sunshine variation or a fluctuation in a screen using the variation information or fluctuation information input from the background learning unit 601, and sets, based on the variation amount, a wait time from generation of a background image to the start of detection processing. The variation amount and the wait time will be described here with reference to FIG. 7. FIG. 7 shows the relationship between the lapse time after background image generation and a detection continuing time of a moving object. In a case in which the variation amount in the screen exceeds a predetermined threshold, the wait time setting unit 602 determines that the influence of the sunshine variation or fluctuation is large, and the detection may be unstable, and makes the gradient of the lapse time after the start of background image generation with respect to the detection continuing time moderate, as indicated by a curve 701. That is, the time length until the detection continuing time reaches the maximum value is made long. Then, the wait time setting unit 602 sets a wait time 703 such that the detection processing is started after the background learning is sufficiently performed. On the other hand, in a case in which the variation amount in the screen is less than the predetermined threshold, the wait time setting unit 602 determines that the influence of the sunshine variation or fluctuation is small, and the detection early stabilizes, and makes the gradient of the lapse time after the background image generation with respect to the detection continuing time steep, as indicated by a curve 702. That is, the time length until the detection continuing time reaches the maximum value is made short. Then, the wait time setting unit 602 accordingly sets a wait time 704 such that the detection processing is started early.

Figure 8:
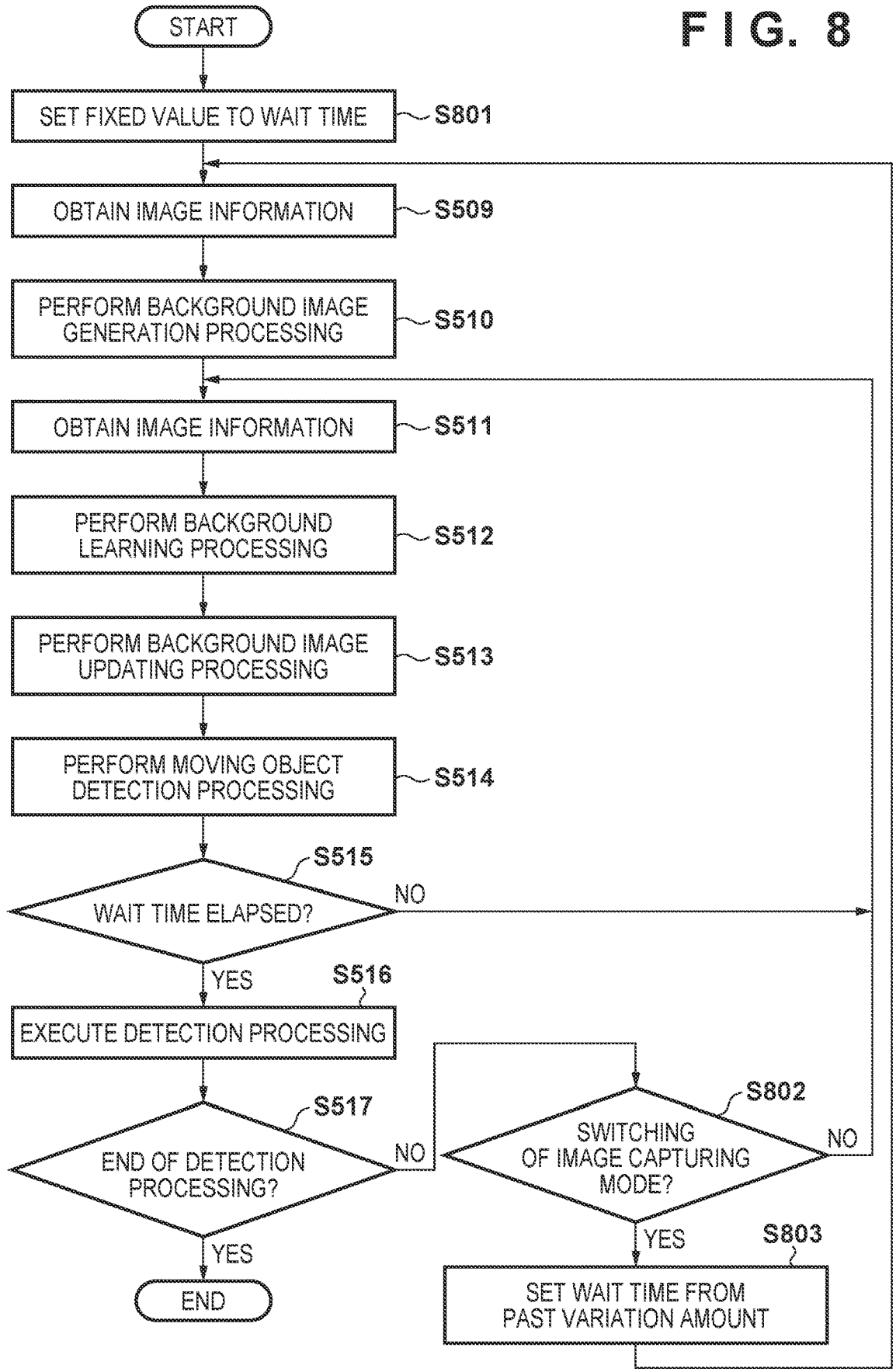
FIG. 8 is a flowchart showing the second example of processing executed by the monitoring apparatus.

An example of the procedure of processing executed in this embodiment will be described with reference to FIG. 8. In one example, this processing is implemented when a control unit 201 executes a program stored in a storage unit 202.

When the monitoring system 1 is activated by, for example, a user operation, and monitoring processing is started, in the monitoring apparatus 120, the wait time setting unit 602 sets 30 sec as the default value of the wait time (step S801). The processing in steps S509 to S517 of FIGS. 5A and 5B is executed using this set value. Upon determining in step S517 not to end the detection processing (NO in step S517), an image capturing mode holding unit 129 determines whether the image capturing mode is changed by a user operation or the like (step S802). Upon determining that there is no change of the image capturing mode (NO in step S802), the monitoring apparatus 120 returns the process to step S511. On the other hand, upon determining that there is a change of the image capturing mode (YES in step S802), the wait time setting unit 602 specifies the variation amount such as the sunshine variation or the fluctuation in the screen using the variation information or fluctuation information input from the background learning unit 601. Then, the wait time setting unit 602 sets the wait time from the start of background image generation to the start of detection processing based on the specified variation amount (step S803). For example, in a case in which the image capturing mode is changed to capture a scene with little motion, the wait time setting unit 602 can set a short wait time. When capturing a scene with much motion, the wait time setting unit 602 can set a long wait time. This setting can be done based on, for example, a motion amount for images captured for each image capturing mode in the past. That is, in a case in which an image capturing mode for which the motion amount is small for images captured in the past is used, a setting to shorten the wait time can be done. For an image capturing mode for which the motion amount is large for images captured in the past, a setting to make the wait time relatively long can be done. Note that in this embodiment, the wait time is updated when the image capturing mode is changed. However, the present invention is not limited to this. For example, the wait time setting unit 602 may determine the magnitude of a motion in the current captured image during learning processing of a background and dynamically change the wait time based on the magnitude.

As described above, by setting the wait time based on the variation amount in the screen at the time of background image generation, it is determined whether no problem occurs if the detection processing is started early, and the wait time is updated. It is consequently possible to prevent the wait time from becoming unnecessary long and start the monitoring processing without causing the user to unnecessarily wait.

In this embodiment as well, the arrangements and processing procedures of the apparatuses are merely examples, and another form may be used to constitute the apparatus or execute processing.

Additionally, for example, in the processing according to the first embodiment, the wait time may be changed based on the amount of a motion in the screen at the time of background image generation according to the second embodiment. For example, the wait time determined as in steps S502 to S508 of FIGS. 5A and 5B may be updated based on the magnitude of a motion. Furthermore, in the first and second embodiments, the monitoring system 1 includes three apparatus, that is, the image input apparatus 100, the monitoring apparatus 120, and the monitor device 140, as described above. However, the present invention is not limited to this. For example, the monitoring system 1 may be implemented by one apparatus. Alternatively, for example, the above-described functions of the monitoring apparatus 120 may be distributed to two or more apparatuses.

In the first and second embodiments, when generating a background image, that is, when starting image capturing or changing the image capturing mode (scene), the wait time up to the start of detection processing can appropriately be set based on the detection mode in the above-described way. This can prevent the monitoring system 1 from unnecessarily being in a wait state for a long time and improve the convenience of the user.

Third Embodiment

In the above-described first and second embodiments, a method of setting the wait time after generation of a background image to the start of execution of detection processing in accordance with activated detection processing has been described. In this embodiment, the wait time is set as a fixed value, and the detection continuing time to continuously detect a moving object is appropriately set. For example, when the layout of an object in a building is changed, the object is detected as a moving object immediately after the change. If the detection continuing time has elapsed in the detected state, the object is handled as a background. On the other hand, in the period until the object is handled as the background, images in the periods can equally be saved because the object is handled as a moving object. This may cause a problem that the images are unnecessarily saved, and the storage capacity of a storage device is wasted. In this embodiment, to cope with such a situation, the detection continuing time is appropriately set, and many unnecessary images are prevented from being saved.

Figure 9:
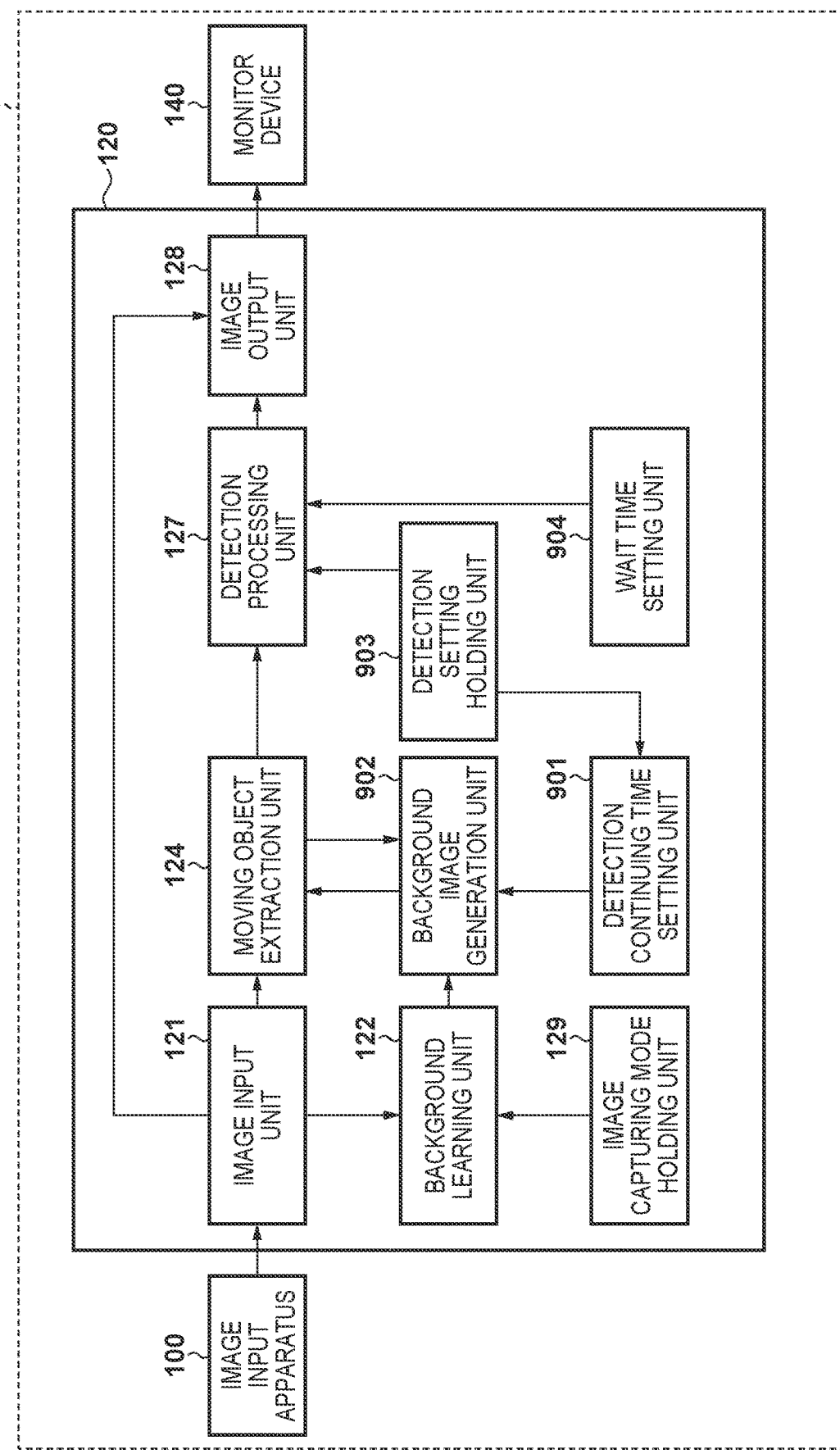
FIG. 9 is a block diagram showing the third example of an example of a system arrangement and the functional arrangement of a monitoring apparatus.

FIG. 9 shows an example of the arrangement of a monitoring system 1 according to this embodiment. In this embodiment, a monitoring apparatus 120 includes a detection continuing time setting unit 901 in addition to the arrangement shown in FIG. 1. In addition, the operations of the background image generation unit, the detection setting holding unit, and the wait time setting unit are changed. For this reason, in this embodiment, these will be referred to as a background image generation unit 902, a detection setting holding unit 903, and a wait time setting unit 904. The detection continuing time setting unit 901 decides the detection continuing time of a moving object in accordance with a detection setting received from the detection setting holding unit 903, and outputs the detection continuing time to the background image generation unit 902. Using the received detection continuing time, the background image generation unit 902 determines whether to save foreground information as a background. Note that the wait time setting unit 904 sets a fixed-length wait time. Note that the fixed-length wait time can be configured to be changeable by, for example, a user operation.

Figure 10:
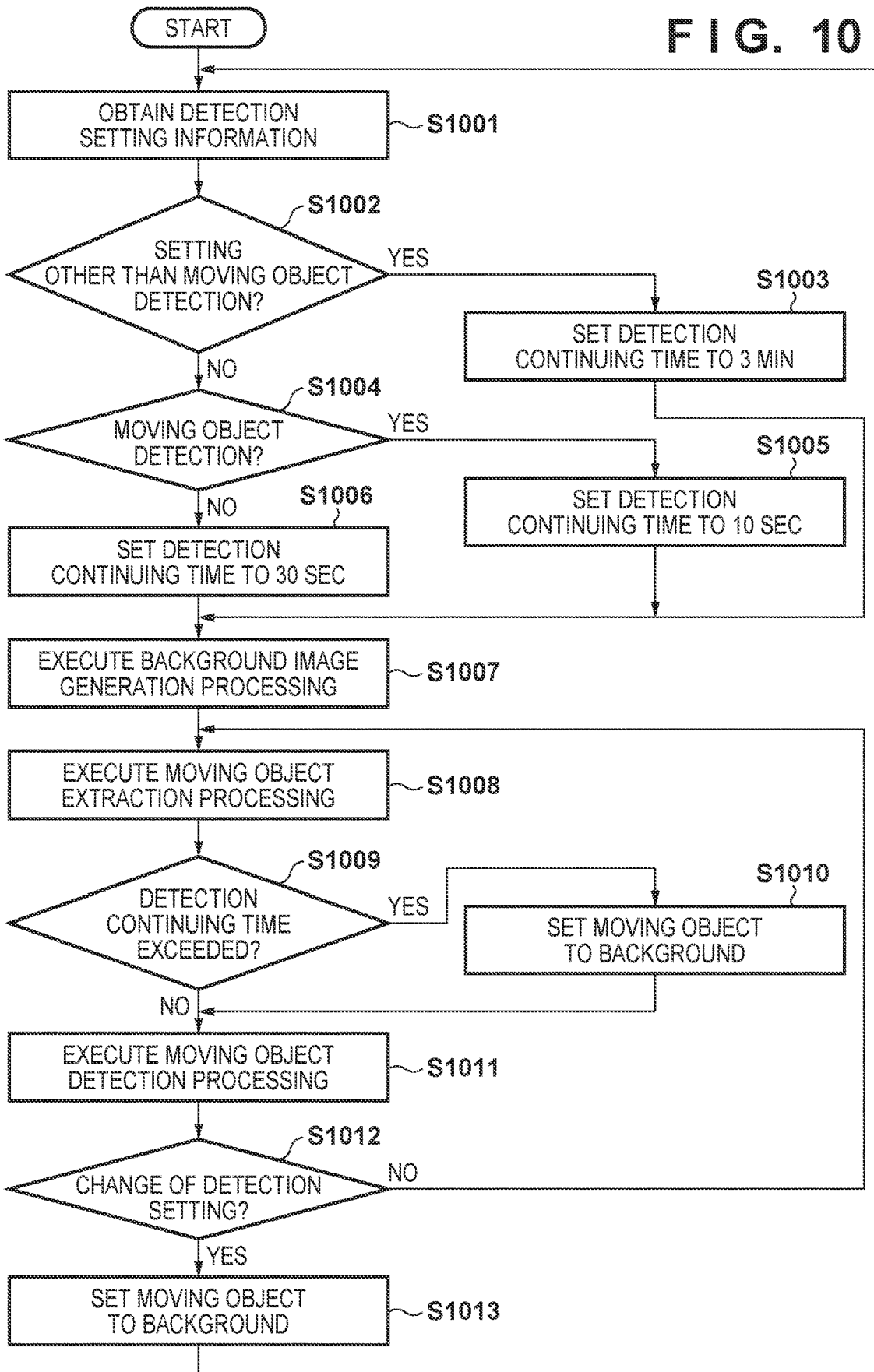
FIG. 10 is a flowchart showing the third example of processing executed by the monitoring apparatus.

An example of the procedure of processing executed by the monitoring apparatus 120 according to this embodiment will be described next with reference to FIG. 10. When the monitoring system 1 is activated by, for example, a user operation, and monitoring processing is started, the monitoring apparatus 120 starts the processing shown in FIG. 10. In one example, this processing is implemented when a control unit 201 executes a program stored in a storage unit 202. However, a description will be made below based on the functional blocks shown in FIG. 9.

In the monitoring apparatus 120, first, the detection continuing time setting unit 901 obtains detection setting information from the detection setting holding unit 903 (step S1001). Then, the detection continuing time setting unit 901 determines, based on the obtained detection setting information, whether a detection setting other than moving object detection is activated (step S1002). In a case in which at least one of, for example, passage detection, abandonment/removal detection, intruding detection, and tampering detection is activated, the detection continuing time setting unit 901 can determine that detection other than moving object detection is activated. Upon determining that a detection setting other than moving object detection is activated (YES in step S1002), the detection continuing time setting unit 901 sets the detection continuing time that is a time to continuously detect a moving object as a moving object to, for example, 3 min (step S1003), and advances the process to step S1007. On the other hand, upon determining that a detection setting other than moving object detection is not activated (NO in step S1002), the detection continuing time setting unit 901 subsequently determines, based on the obtained detection setting information, whether moving object detection is activated (step S1004). Upon determining that moving object detection is activated (YES in step S1004), the detection continuing time setting unit 901 sets the detection continuing time to, for example, 10 sec (step S1005), and advances the process to step S1007. Upon determining that moving object detection is not activated (NO in step S1004), the detection continuing time setting unit 901 sets the detection continuing time to, for example, 30 sec (step S1006), and advances the process to step S1007.

In step S1007, an image input unit 121 obtains image information from an image input apparatus 100, and the background image generation unit 902 generates a background image based on background image information input from a background learning unit 122. The background image generation unit 902 repeats updating processing of the background image using variation information or fluctuation information obtained from the background learning unit 122 until the wait time set by the wait time setting unit 904 elapses.

When the wait time elapses, and the updating processing of the background image is completed, a moving object extraction unit 124 subsequently compares the image information input from the image input unit 121 with the background image and a foreground image input from the background image generation unit 902 and performs moving object extraction processing (step S1008). The extracted moving object information is sent to the background image generation unit 902 and saved together with an appearance count value representing a time in which the saved moving object appears in the foreground image information. The background image generation unit 902 compares the appearance count value of the foreground information with the detection continuing time received from the detection continuing time setting unit 901, and determines whether the appearance count value exceeds the detection continuing time (step S1009). In a case in which the appearance count value for the extracted moving object exceeds the detection continuing time (YES in step S1009), the background image generation unit 902 handles the moving object as a background (step S1010), and advances the process to step S1011. Note that according to the background setting of the moving object, the foreground information concerning the moving object is discarded. On the other hand, in a case in which the appearance count value for the extracted moving object does not exceed the detection continuing time (NO in step S1009), the background image generation unit 902 advances the process to step S1011 without executing the process of step S1010. In step S1011, a detection processing unit 127 executes various kinds of detection processing based on the detection setting information obtained from the detection setting holding unit 903. In a case in which a moving object is detected in accordance with the detection setting, an image captured at the timing of the detection is saved. Note that in step S1009, for example, even in a case in which the detection continuing time is set to be shorter than the maximum detection continuing time, the foreground information may be maintained based on the maximum detection continuing time. In this case, since the detection processing is executed based on the foreground information in step S1011, images captured until the maximum detection continuing time elapses are saved. Hence, after the moving object comes to rest, and the maximum detection continuing time elapses, images corresponding to the set detection continuing time may be left, and the remaining images may be discarded. At this time, if the setting is changed to extend the detection continuing time before the images are discarded, images corresponding to the extended detection continuing time can be left. Accordingly, if the setting is changed midway, a detection result corresponding to the setting after the change can be output while preventing the storage capacity from being wasted.

After the process of step S1011, the detection setting holding unit 903 determines whether the detection setting is updated by, for example, a user operation (step S1012). If the detection setting is not updated (NO in step S1012), the process returns to step S1008. On the other hand, if the detection setting is updated (YES in step S1012), the detection setting holding unit 903 updates the detection setting (step S1013), and returns the process to step S1001.

An example concerning how the detection operates in a scene in which a person appears in a screen by opening a door, and after that, moves and leaves the screen while keeping the door open will be described next with reference to FIGS. 11A to 11E. In this example, a background image is captured in an initial state in which a door 1101 is included in the image capturing range, as shown in FIG. 11A. In this state, when a person appears by opening the door, an image as shown in FIG. 11B is input. In this image, regions 1111 and 1112 indicated by broken lines are extracted as moving objects and saved as foreground information. After that, in a case in which the door is kept open during the movement of the person from the screen, the appearance count of the region 1111 in which the door is detected continuously increases. On the other hand, for the portion of the person, the detection position moves along with the movement of the person. For the input image shown in FIG. 11B, the moving object is detected in the region 1112. For the input image shown in FIG. 11C, the moving object is detected at the position of a region 1122. Since the detection region continuously moves, the appearance counts of the foreground region 1112 and the region 1122 do not increase. Additionally, when the person further moves and reaches the outside of the image capturing range, a screen shown in FIG. 11D is input, and only the region 1111 of the door is continuously detected as a moving object. In a case in which only moving object detection is set in the detection setting, the detection continuing time is set to 10 sec by the process of step S1005 in accordance with the processing shown in FIG. 10. For this reason, the appearance count value of the portion of the door exceeds the detection continuing time after 10 sec. Hence, the region of a door 1141 is set to a background by the process of step S1010, as shown in FIG. 11E, and the region is not detected as a moving object any more.

In a case in which abandonment detection is set in the detection setting, the detection continuing time is set to 3 min by the process of step S1003. For this reason, the door is continuously detected, as shown in FIG. 11D, for 3 min from the opening of the door. On the other hand, in a case in which only moving object detection is set, the detection continuing time is set to 10 sec by the process of step S1005. Accordingly, for example, in the situation shown in FIGS. 11A to 11E, when moving object detection of detecting a person who appears through the door or a person who leaves through the door is used, whether the door is open or not does not matter, and therefore, the current state of the door can quickly be set to the background. This can prevent the door from being detected as a moving object for an unnecessarily long period and suppress the number of images to be saved. On the other hand, for example, when abandonment or removal of an object is to be monitored in the situation shown in FIGS. 11A to 11E, the door is continuously detected as a moving object, but the state in which the object is abandoned or removed can be recorded for a long period. Note that in a case in which any detection processing is not set, the detection continuing time is set to 30 sec by the process of step S1006. For this reason, the door is continuously detected as a moving object for 30 sec after the opening of the door. As a result, when the user does the detection setting later, a state in which the door is continuously detected as a moving object, as shown in FIG. 11D, can be confirmed for 30 sec. Hence, the user can set the region of abandonment detection while confirming the detection result.

As described above, when a suitable detection continuing time is set depending on the detection setting, it is possible to prevent an object from unnecessarily continuously being detected as a moving object and improve the convenience of the user.

Fourth Embodiment

In the third embodiment, the detection continuing time is set in accordance with the detection setting. In some cases, the suitable detection continuing time may change depending on the installation state of the image capturing apparatus (camera). For example, since persons are always moving in a busy place such as a passage in a crowded station, detection of a moving object is not required, but detection of an object at rest such as an abandoned object or a person lying down without any motion may be required. Additionally, in a case in which a person, who is alone in a deserted place, falls down and is immovable, the person is required to be continuously detected during the period in which the person is included in the screen. In this case, when the detection continuing time is made long, an object abandoned for a long time can be detected. In this embodiment, the initial value of the detection continuing time is fixed, and the detection continuing time is adaptively updated in accordance with the detection state.

Figure 12:
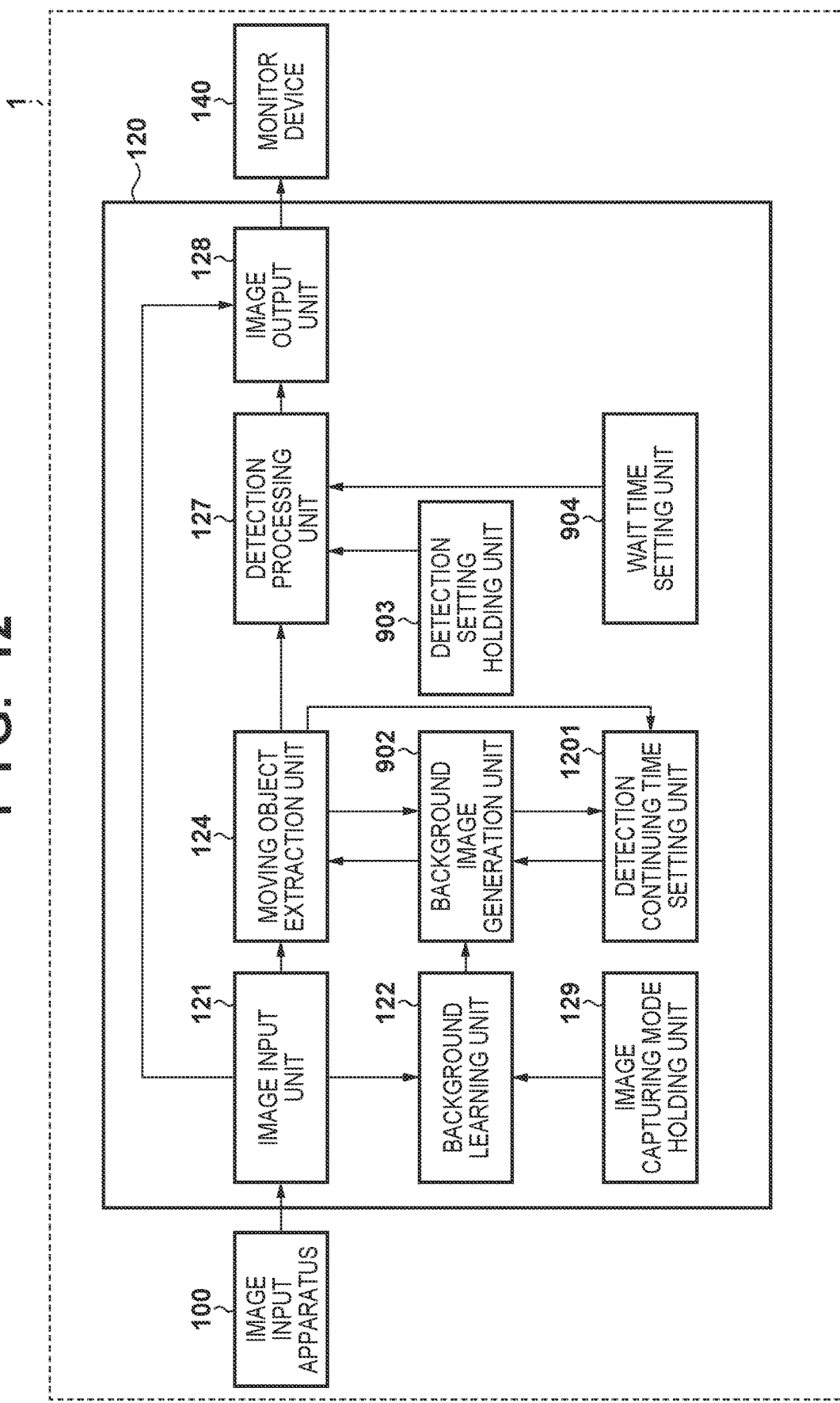
FIG. 12 is a block diagram showing the fourth example of an example of a system arrangement and the functional arrangement of a monitoring apparatus.

FIG. 12 shows an example of the arrangement of a monitoring system 1 according to this embodiment. In this system, information obtained by a detection continuing time setting unit 1201 of a monitoring apparatus 120 is different from that in the first embodiment. The detection continuing time setting unit 1201 obtains a moving object extraction result from a moving object extraction unit 124, and obtains, from a background image generation unit 902, the appearance count information of a foreground saved in the background image generation unit 902. The detection continuing time setting unit 1201 changes the detection continuing time based on the moving object extraction result received from the moving object extraction unit 124 and the appearance count information of the foreground received from the background image generation unit 902, and transmits it to the background image generation unit 902. Using the received detection continuing time, the background image generation unit 902 decides whether to handle the foreground information as a background.

Figure 13:
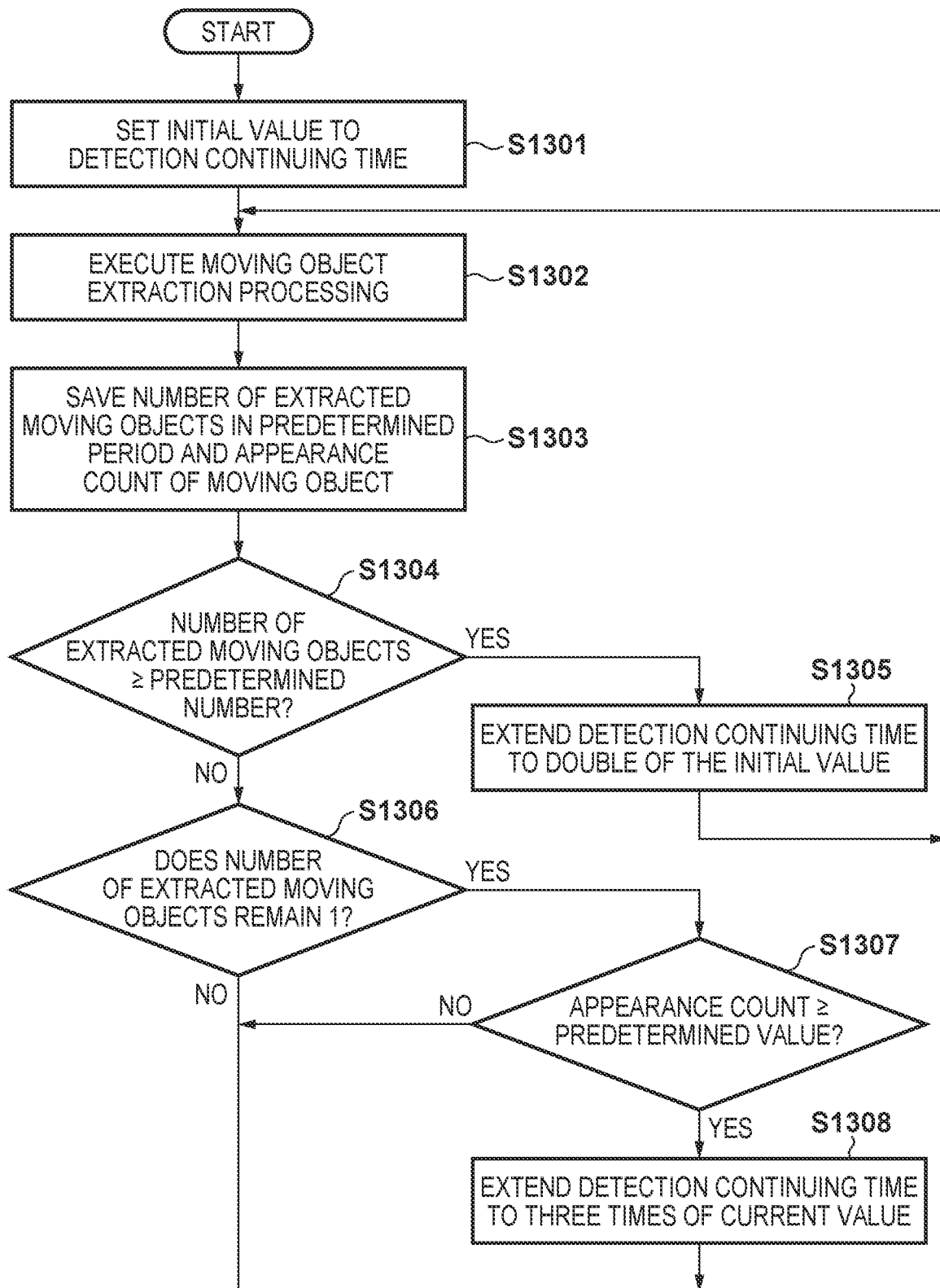
FIG. 13 is a flowchart showing the fourth example of processing executed by the monitoring apparatus.

A procedure of changing the detection continuing time according to this embodiment will be described next with reference to FIG. 13. In one example, this processing is implemented when a control unit 201 executes a program stored in a storage unit 202. However, a description will be made below based on the functional blocks shown in FIG. 12.

First, the detection continuing time setting unit 1201 sets an initial value (for example, 10 sec) to the detection continuing time (step S1301). Then, the moving object extraction unit 124 executes moving object extraction processing (step S1302). The detection continuing time setting unit 1201 saves the number of moving objects extracted during a predetermined period (for example, 30 sec) based on the extraction result obtained from the moving object extraction unit 124, and saves the appearance count of each moving object during the predetermined period, which is obtained from the background image generation unit 902 (step S1303). The detection continuing time setting unit 1201 then calculates the average of the number of extracted moving objects during the predetermined period and determines whether the average value exceeds a predetermined threshold (step S1304). Upon determining that the number of extracted moving objects in the predetermined period is equal to or more than the predetermined number (YES in step S1304), the detection continuing time setting unit 1201 changes the detection continuing time to the double (for example, 20 sec) of the initial value (step S1305), and output the detection continuing time after the change to the background image generation unit 902. The process then returns to step S1302. This makes it possible to detect abandonment/removal or a person who falls down and is immovable in an image with much motion such as an image captured by an image capturing apparatus installed in a busy place. Note that since a moving object that only passes is extracted as a moving object but not continuously detected, as described with reference to FIG. 11A to 11E, abandonment/removal or a person who does not move can efficiently be detected by this processing. Note that if the number of extracted moving objects in the predetermined period becomes less than the above-described predetermined number after extension of the detection continuing time, the detection continuing time may be returned to the value before the change. This can appropriately set the detection continuing time in accordance with the situation. In addition, the detection continuing time may be returned to the original value on condition that the number of extracted moving objects in the predetermined period becomes less than a second predetermined number smaller than the above-described predetermined number. This can prevent the detection continuing time from being repetitively changed.

On the other hand, upon determining that the number of extracted moving objects in the predetermined period is less than the predetermined number (NO in step S1304), the detection continuing time setting unit 1201 subsequently determines whether the number of extracted moving objects remains 1 in the predetermined period (step S1306). Upon determining that the number of extracted moving objects (average value) remains 1 in the predetermined period (YES in step S1306), the detection continuing time setting unit 1201 determines whether the appearance count of the foreground corresponding to the moving object is equal to or more than a predetermined value (step S1307). Here, the predetermined value is for example, ⅘ (for example, 8 sec) of the detection continuing time. Upon determining that the appearance count of the foreground is equal to or more than the predetermined value (YES in step S1307), the detection continuing time setting unit 1201 changes the detection continuing time to three times of the current value (step S1308). For example, if the detection continuing time is 10 sec, the time is changed to 30 sec in step S1308. The detection continuing time setting unit 1201 outputs the information of the detection continuing time after the change to the background image generation unit 902. This makes it possible to continuously detect, for example, a person who is alone and immovable in a deserted place. Note that in a case in which, for example, the detected moving object moves later, and the number of extracted moving objects in the predetermined period changes, the detection continuing time may be returned to the initial value. This can adaptively control the detection continuing time in accordance with the situation. After the end of the process of step S1308, if the number of extracted moving objects does not remain 1 in the predetermined period (NO in step S1306), or if the appearance count of the foreground is less than the predetermined value (NO in step S1307), the process returns to step S1302.

As described above, when the detection continuing time is appropriately set in accordance with the installation state of the image capturing apparatus or the state of a scene that is being captured, appropriate detection processing according to the situation can be executed.

Note that in step S1306, it is determined whether the number of extracted moving objects remains 1 in the predetermined period, as described above. However, the present invention is not limited to this. For example, it may be determined whether the number of extracted moving objects is equal to or less than the second predetermined number smaller than the predetermined number in step S1304 in the predetermined period. That is, the determination of step S1307 may be performed when the number of moving objects is sufficiently small. In addition, the determination of step S1306 may not be performed. That is, upon determining in step S1304 that the number of extracted moving objects is less than the predetermined number, it may be determined whether there exists a moving object (foreground) whose appearance count is equal to or more than a predetermined value. That is, the detection continuing time can be set/updated based on at least one of the number of extracted moving objects and the length of time in which a moving object is continuously extracted as a foreground.

In the third embodiment, the detection continuing time is decided depending on which detection processing is set. However, the detection continuing time may be decided by determining whether a moving object is detected in a set detection region. For example, the monitoring apparatus 120 sets the initial value of the detection continuing time to 10 sec and checks whether a moving object is detected in a detection region in which a detection type other than moving object detection is set. Upon confirming that a moving object is detected in the detection region in which a detection type other than moving object detection is set, the monitoring apparatus 120 can set a detection continuing time to a time longer by, for example, 1 min than the detection determination time of the detection type. The monitoring apparatus 120 may be configured to return the detection continuing time to the initial value (10 sec) in a case in which no moving object is detected any more in the detection region later. Accordingly, it is possible to adaptively set the detection continuing time in accordance with the actual detection situation and execute more appropriate detection processing.

Additionally, in the fourth embodiment, the amount of motion is determined by determining whether the number of extracted moving objects is equal to or more than a predetermined number. However, the amount of motion may be specified based on, for example, the information of codec. If the amount of motion exceeds a predetermined value, the detection continuing time may be extended. In addition, the detection continuing time may be set in accordance with the complexity of the background image. For example, in an image capturing environment to obtain a complex background image in which a variation or fluctuation readily occurs, the detection continuing time can be set to be short such that a background erroneously detected as a moving object due to the variation or fluctuation is early set to the background. On the other hand, in an image capturing environment to obtain a background image with less complexity in which a variation or fluctuation hardly occurs, the detection continuing time can be set to be long because the probability of an error to detect a background as a moving object is low. Note that the setting of these detection continuing times may be done based on the setting of the detection type such as a period in which detection processing other than moving object detection is inactivated.

Additionally, in the third and fourth embodiments, an example in which the detection continuing time is set based on one of the detection setting and the installation state of the image capturing apparatus has been described. However, the present invention is not limited to this, and the detection continuing time may be decided by the combination of pieces of information. For example, the initial value of the detection continuing time may be decided by the combination of set detection settings, and the detection continuing time may be changed from the initial value in accordance with a later detection result of a moving object.

In addition, the detection continuing time may adaptively be changed based on the actual result of moving object detection by detection processing. For example, the initial value of the detection continuing time is set to, for example, 5 sec in each detection type. In this state, detection in each detection type is executed, and the length of the period in which a moving object is detected by the temporary detection is checked. This detection can be temporary detection in a case in which background setting is not performed in 5 sec. That is, temporary detection is performed to specify a period until an object detected as a moving object further moves later as a period to continuously detect the moving object in a case in which it is assumed that background setting is not performed. Then, the detection continuing time can be updated in accordance with the length of the period specified for each detection type. For example, the maximum value of the length of the period specified for each detection type can be set as the detection continuing time for each detection type. Note that at this time, if the period in which an object is continuously detected as a moving object by temporary detection exceeds a predetermined value, it is determined that the object is not a moving object, and the length of the period in that case may be inhibited from being used to update the detection continuing time. That is, the length of the period in which a moving object should be detected as a moving object can be obtained by temporary detection, and the necessary detection continuing time can be decided in accordance with the length of the period. At this time, it can be decided to use the longest one of the detection continuing times specified for the activated detection types. This can set the detection continuing time in accordance with the actual detection environment. Additionally, for example, the number of objects set to the background in a predetermined period may be counted, and the detection continuing time may be made long as the number of objects increases. That is, if the number of objects set to the background is large, the frequency of background setting may be high because the detection continuing time is too short. Hence, if the frequency of background setting is high, the detection continuing time may be made long. Note that in this case, the maximum value of the detection continuing time may be prepared, and prolonging of the detection continuing time beyond this may be inhibited. In addition, in these processes, the length of the detection continuing time can be returned to the value before updating in accordance with continuation of a state in which no moving object is detected beyond a predetermined time length. The value before updating may be a value before the immediately preceding updating or, for example, a value before a predetermined number of updating processes. In one example, the monitoring apparatus 120 can hold the history of updating and gradually return the setting of the detection continuing time to the initial value every time the state in which no moving object is detected continues. Note that the monitoring apparatus 120 may return the setting of the detection continuing time to a value before all updating processes are performed, that is, the initial value, in accordance with continuation of the state in which no moving object is detected beyond a predetermined time length. Accordingly, for example, after the image capturing state temporarily becomes a special state, continuous influence of the special state can be prevented, and an appropriate detection continuing time according to the state can be set. Note that the processes according to the third and fourth embodiments and these processes may be used in an arbitrary combination. Similarly, the processes described in this specification can arbitrarily be combined.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-055101, filed Mar. 22, 2018, which is hereby incorporated by reference herein in its entirety.

What is claimed is:

1. An image processing apparatus comprising a computer executing instructions that, when executed by the computer, cause the computer to function as:

a generation unit configured to generate a background image based on an image captured by an image capturing unit;

a detection unit configured to detect an object in an image captured by the image capturing unit, by a background subtraction method;

a determination unit configured to determine which detection process is to be performed among a plurality of types of detection processes;

a setting unit configured to set a detection continuing time used for determining whether or not to reflect presence in the background image of the object detected by the detection unit, in accordance with the detection process determined to be performed; and an updating unit configured to update the background image to reflect presence of an object in a case where the object has been stationary for over the detection continuing time, wherein the setting unit (a) sets the detection continuing time to a first time in accordance with the detection process determined to be performed being at least one of (i) passage detection, (ii) abandonment/removal detection, (iii) intrusion detection, and (iv) tampering detection, and (b) otherwise sets the detection continuing time to a time smaller than the first time.

2. The image processing apparatus according to claim 1, wherein the setting unit sets, when a plurality of detection processes are to be performed, the detection continuing time according to a longest time among predetermined times respectively associated with the detection processes.

3. The image processing apparatus according to claim 1, wherein the plurality of types of detection processes includes at least one of (a) passage detection, (b) abandonment/removal detection, (c) intrusion detection, and (d) tampering detection.

4. The image processing apparatus according to claim 1, wherein the detection unit is configured to detect the object in an image by using the updated background image.

5. The image processing apparatus according to claim 1, wherein the setting unit is configured to set, when a number of the objects detected within a predetermined time is equal to or greater than a predetermined value, the detection continuing time to be longer.

6. The image processing apparatus according to claim 3, wherein the setting unit sets the detection continuing time to a first time in accordance with the detection process determined to be performed being a first type of detection process, and sets the detection continuing time to a second time different from the first time in accordance with the detection process determined to be performed being a second type of detection process different from the first type of detection process.

7. An image processing method comprising:
generating a background image based on an image captured by an image capturing unit;
detecting an object in an image captured by the image capturing unit, by a background subtraction method;
determining which detection process is to be performed among a plurality of types of detection processes;
setting a detection continuing time used for determining whether or not to reflect presence in the background image of the detected object, in accordance with the detection process determined to be performed; and
updating the background image to reflect presence of an object in a case where the object has been stationary for over the detection continuing time,
wherein the setting (a) sets the detection continuing time to a first time in accordance with the detection process determined to be performed being at least one of (i) passage detection, (ii) abandonment/removal detection, (iii) intrusion detection, and (iv) tampering detection, and (b) otherwise sets the detection continuing time to a time smaller than the first time.

8. A non-transitory computer-readable storage medium storing instructions that can be read by a computer, the instructions, when executed, causing the computer to perform an image processing method comprising:
generating a background image based on an image captured by an image capturing unit;
detecting an object in an image captured by the image capturing unit, by a background subtraction method;
determining which detection process is to be performed among a plurality of types of detection processes;
setting a detection continuing time used for determining whether or not to reflect presence in the background image of the detected object, in accordance with the detection process determined to be performed; and
updating the background image to reflect presence of an object in a case where the object has been stationary for over the detection continuing time,
wherein the setting (a) sets the detection continuing time to a first time in accordance with the detection process determined to be performed being at least one of (i) passage detection, (ii) abandonment/removal detection, (iii) intrusion detection, and (iv) tampering detection, and (b) otherwise sets the detection continuing time to a time smaller than the first time.

* * * * *